US 007804049B2

(12) United States Patent
De'Longhi

(10) Patent No.: US 7,804,049 B2
(45) Date of Patent: Sep. 28, 2010

(54) ELECTRICALLY POWERED OVEN, IN PARTICULAR FOR BAKING OR HEATING SLICED BREAD, AND HEATING PROCEDURE

(75) Inventor: Giuseppe De'Longhi, Vicolo Rovero 1, Treviso (IT)

(73) Assignee: Giuseppe De'Longhi, Treviso (IT)

( * ) Notice: Subject to any disclaimer, the term of this patent is extended or adjusted under 35 U.S.C. 154(b) by 948 days.

(21) Appl. No.: 10/524,942

(22) PCT Filed: Oct. 29, 2002

(86) PCT No.: PCT/EP02/12055

§ 371 (c)(1),
(2), (4) Date: Feb. 8, 2005

(87) PCT Pub. No.: WO2004/018943

PCT Pub. Date: Mar. 4, 2004

(65) Prior Publication Data

US 2006/0016797 A1 Jan. 26, 2006

(30) Foreign Application Priority Data

Aug. 9, 2002 (IT) .............................. MI02A1818

(51) Int. Cl.
*H05B 3/06* (2006.01)
*F24C 7/06* (2006.01)
*A21B 1/00* (2006.01)

(52) U.S. Cl. ........................ 219/520; 219/406; 219/408

(58) Field of Classification Search ......... 219/241–417, 219/483, 484, 486, 537; 99/339–349, 325; 126/339, 21 A
See application file for complete search history.

(56) References Cited

U.S. PATENT DOCUMENTS

| 1,364,811 | A |   | 1/1921  | Rutenber        |         |
|-----------|---|---|---------|-----------------|---------|
| 2,112,035 | A | * | 3/1938  | Lockwood et al. | 337/365 |
| 2,174,079 | A |   | 9/1939  | Dadson          |         |
| 2,316,699 | A |   | 4/1943  | Myers           |         |
| 2,872,558 | A | * | 2/1959  | Price           | 219/532 |
| 3,270,183 | A | * | 8/1966  | Jordan          | 219/398 |
| 3,548,154 | A | * | 12/1970 | Christiansson   | 219/403 |
| 4,487,116 | A |   | 12/1984 | Routhier        |         |
| 4,623,781 | A | * | 11/1986 | Thomas          | 219/413 |
| 5,534,678 | A | * | 7/1996  | Bowles et al.   | 219/396 |
| 5,938,959 | A |   | 8/1999  | Wang            |         |
| 6,020,577 | A | * | 2/2000  | Barker          | 219/537 |

FOREIGN PATENT DOCUMENTS

| AP | 470      | 3/1996  |
| DE | 42 17 545 | 12/1993 |
| FR | 2 579 869 | 10/1986 |

* cited by examiner

*Primary Examiner*—Quang T Van
(74) *Attorney, Agent, or Firm*—Andrew Wilford

(57) ABSTRACT

An electrical oven has a housing and a plurality of resistors in the housing electrically energizeable to radiate heat. At least one of the resistors subdivides the housing into an upper baking chamber and a lower baking chamber. A support frame in the housing including a pair of bars flanking the one resistor so as to deflect radiant energy therefrom into the upper and lower chambers. This support frame forms seats holding the one resistor.

6 Claims, 3 Drawing Sheets

ELECTRICALLY POWERED OVEN, IN PARTICULAR FOR BAKING OR HEATING SLICED BREAD, AND HEATING PROCEDURE

CROSS REFERENCE TO RELATED APPLICATIONS

This application is the US national phase of PCT application PCT/EP2002/012055 filed 29 Oct. 2002 with a claim to the priority of Italian patent application MI2002A001818 itself filed 9 Aug. 2002, whose entire contents are herewith incorporated by reference.

FIELD OF THE INVENTION

The present invention relates to an electrically powered oven, in particular for baking or heating sliced bread, and to a heating procedure.

In particular in the following description, reference shall be made to electrically powered ovens, that is, provided with electrical resistors capable of radiating energy in the form of infrared radiation.

BACKGROUND OF THE INVENTION

Ovens of this type comprise a box-shaped housing provided with electrical heating resistors arranged at their upper and lower walls. Such ovens define a single baking chamber and therefore are of very restricted capacity. In fact, such ovens are often very small.

Moreover, despite the small size, the distance between the upper and lower resistors is too much to allow baking sliced bread on both faces evenly, quickly and with a low energy consumption.

Multiple baking-chamber ovens have been developed in order to increase the oven capacity and reduce the distance of resistors from the sliced bread.

Such ovens have an inside intermediate wall which usually delimits two baking chambers reciprocally superimposed.

Moreover, in order to ensure good irradiation and therefore sufficiently quick and even baking or heating, traditional ovens are provided with additional resistors arranged at each of the two faces of the intermediate wall.

However, traditional ovens have several disadvantages that are apparent both during use and during manufacture.

In fact in the first case the advantages mainly relate to the high electrical consumption caused by the dual central resistor and to the great difficulty of cleaning the baking chambers, since the resistors mounted on the intermediate wall hinder access to same and make access to the farthest edges from the access port very difficult.

Moreover, sliced bread must be arranged as close as possible to the resistors to optimize toasting. This implies that in such ovens it is not possible to bake other foodstuff besides slices of bread. In fact, due to the limited distance between the foodstuff to bake and the resistors, and due to the high temperatures at which the same resistors are brought, traditional ovens are not suitable for baking anything other than slices of bread.

With products that are not sliced bread, in fact, it is necessary to heat very slowly so as to optimise thermal diffusion from outer to inner regions in order to prevent burning the surface of the foodstuff being baked before heat diffuses inside it for a complete baking of the product, due to the high resistor temperature.

On the other hand in the second case, the fact of having to provide intermediate wall in the oven housing and two electrical resistors requires several additional manufacturing steps and costs due to the higher number of elements used.

OBJECTS OF THE INVENTION

Therefore, the technical task of the present invention is to provide an electrically powered oven, in particular for baking or heating sliced bread, and a heating procedure thereof, which should allow eliminating the technical disadvantages of the prior art.

Within the scope of this technical purpose, another object of the invention is to provide an oven whose electrical consumption should be lower than traditional ovens, number of baked slices of bread being equal.

Another object of the invention is to provide an oven which should be easy to clean in all of its parts, also at regions far from the access port.

A further object of the invention is to provide an oven which should be suitable for baking various products, also different from slices of bread, thoroughly and without burning their surfaces.

Last but not least, another object of the invention is to provide an oven with reduced manufacturing costs and time compared to is what required with traditional ovens, and which should be capable of baking up to six slices of bread at the same time (six above and six below).

SUMMARY OF THE INVENTION

These and other objects according to the present invention are attained in an electrically powered oven, in particular for baking or heating sliced bread, comprising a box-shaped housing inside which there are housed one or more electrical resistors intended to radiate energy into the housing for baking or heating the sliced bread. According to the invention at least one resistor is arranged into the housing so as to define at least two baking chambers and has baffle means intended to direct the radiated energy toward the baking chambers.

Advantageously, the present invention also relates to a procedure for heating an electrically powered oven, in particular for baking or heating sliced bread, characterized in that it consists in radiating energy mainly toward the lower portion of the oven by at least one resistor that is arranged in an intermediate position of the box-shaped housing and that defines at least two baking chambers, so that the effect of natural convection into the baking chambers is comparable.

BRIEF DESCRIPTION OF THE DRAWING

Further features and advantages of the invention will appear more clearly from the description of a preferred but non-limiting embodiment of the electrically powered oven, in particular for baking or heating sliced bread, and of the procedure for heating it according to the invention, where the oven is shown by way of a non-limiting example in the attached drawings. In such drawings.

SPECIFIC DESCRIPTION

Figure 1:
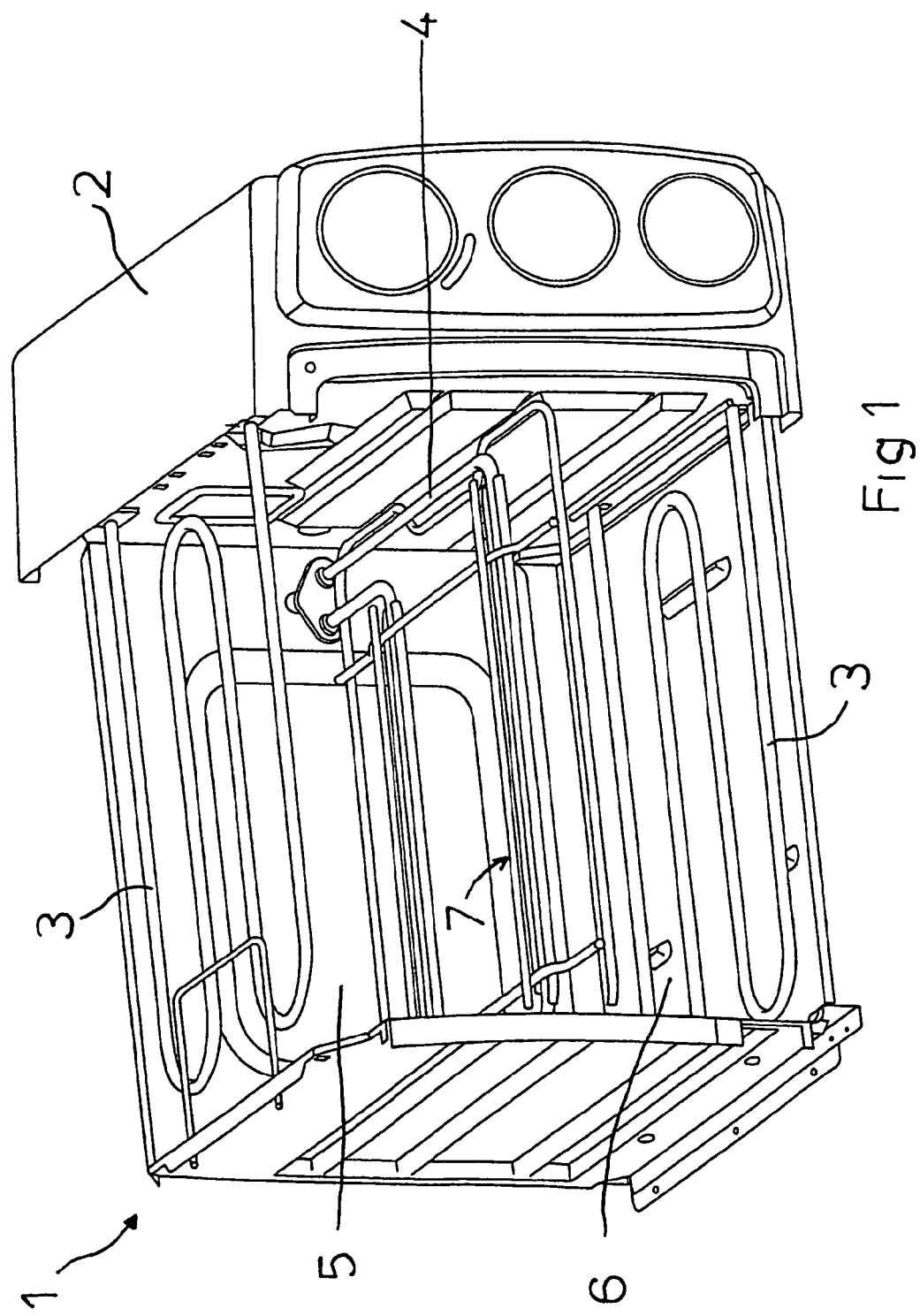
FIG. 1 shows a perspective view of an oven according to the present invention, without a portion of its box-shaped housing.
Figure 2:
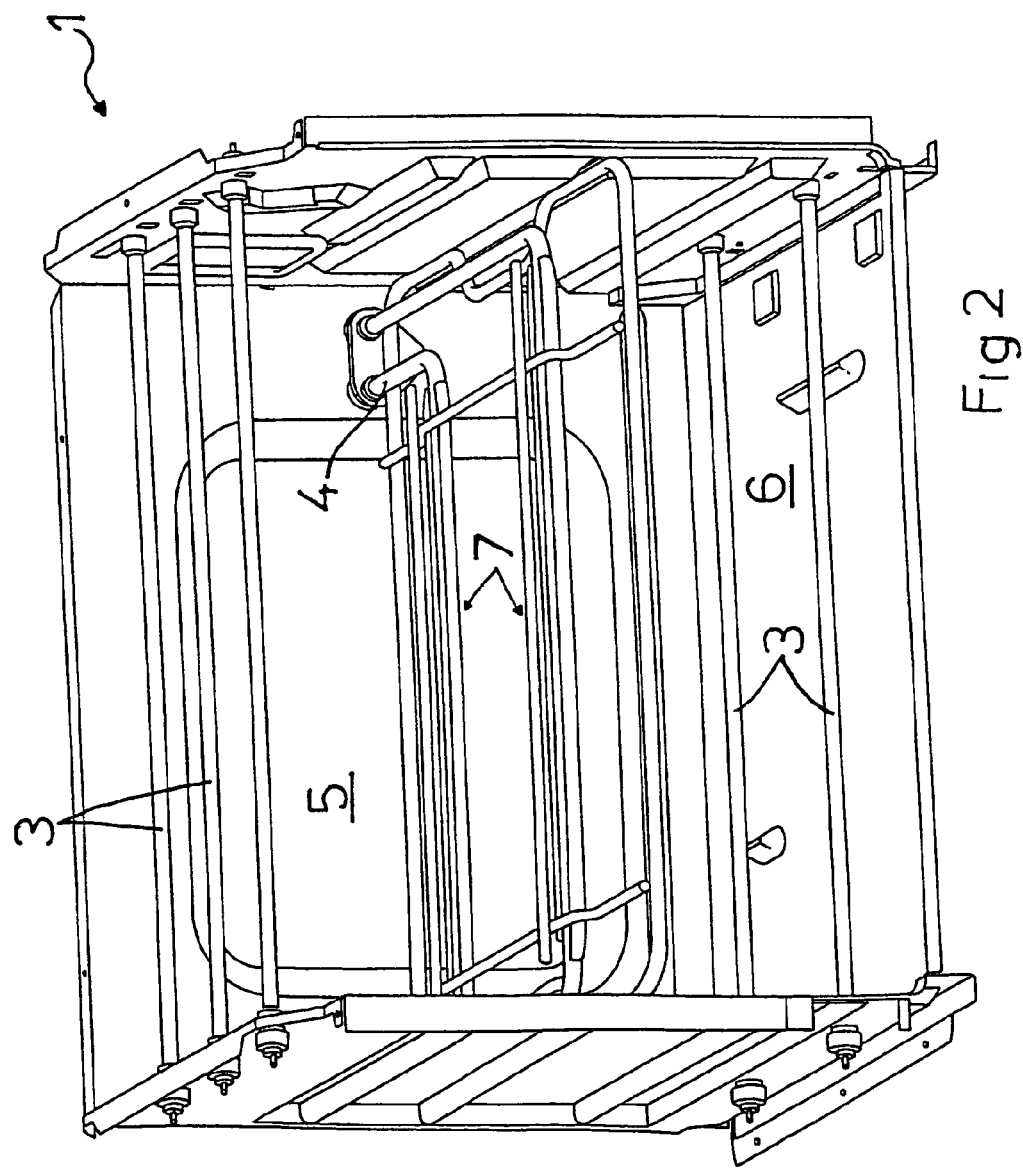
FIG. 2 shows an enlarged detail of the baking chambers of the oven according to the invention.
Figure 3:
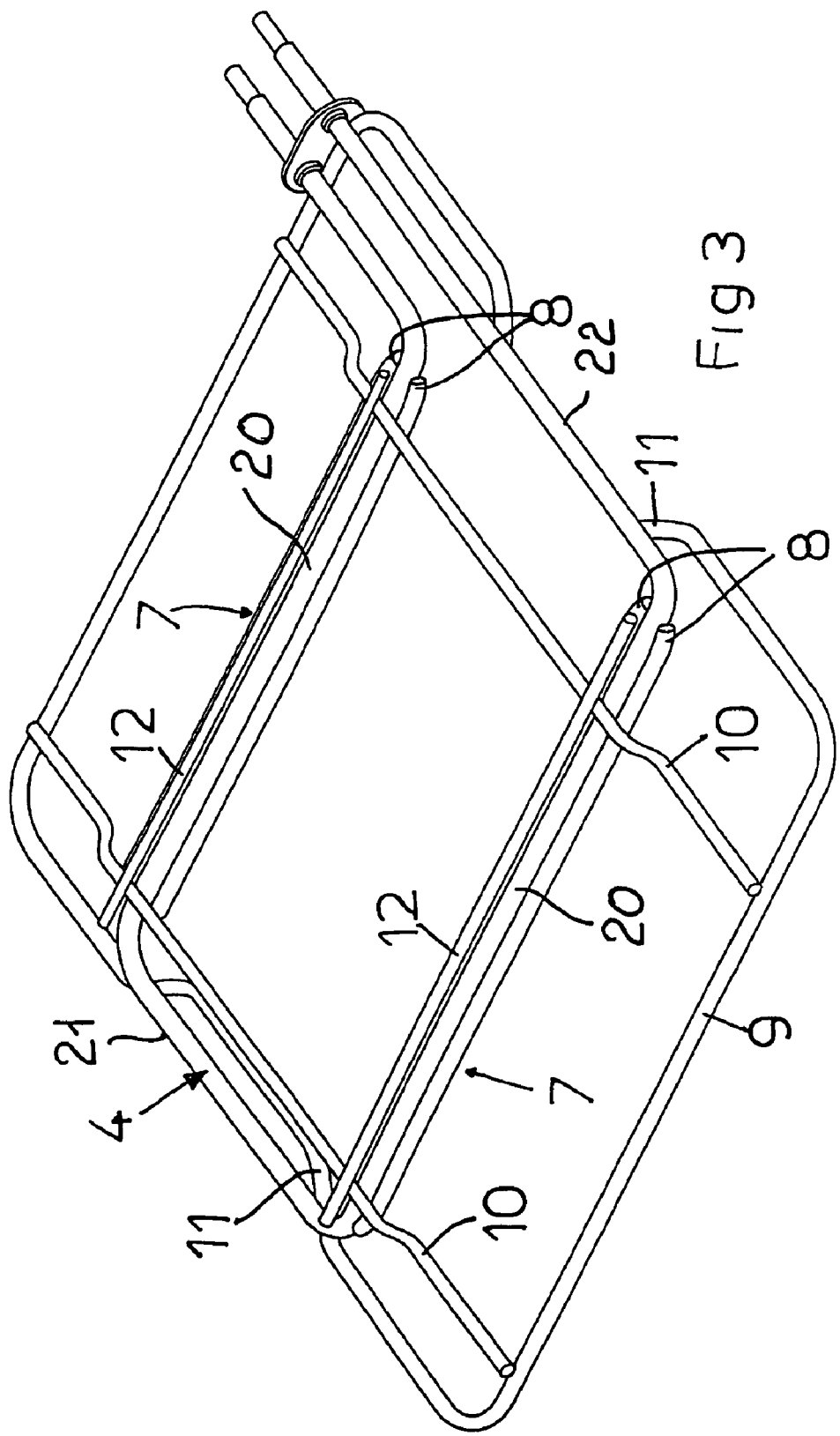
FIG. 3 shows an enlarged detail of a support frame and of an electrical resistor of the oven according to the invention.

With reference to the figures mentioned above, an electrically powered oven, in particular for baking or heating sliced bread, is shown and globally referred to with reference numeral 1. Oven 1 comprises a box-shaped housing 2 (only partly shown) inside which there are housed one or more electrical resistors 3 intended to radiate energy into the housing 2 to bake or heat sliced bread (not shown).

Advantageously, a resistor 4 is arranged in the housing 2 in an intermediate position between its upper and lower walls so as to define at least two baking chambers 5, 6.

Advantageously, resistor 4 has baffle means 7 adapted to direct the radiated energy toward the baking chambers 5, 6. The baffle means 7 comprises first elongated members 8 flanking at least one portion (and in particular, two portions 20) of the resistor. The two portions 20 of the resistor 4 are reciprocally jointed by other shorter portions 21 and 22 of the same resistor 4.

In the example shown, the two parallel portions 20 of resistor 4 are juxtaposed on the two sides by the elongated members 8. Such first members 8 are connected to a support frame 9 and define seats in which portions of the resistor 4 are slidably held. In this way, the frame 9 can support the resistor 4, thereby overcoming all problems related to the deformations undergone by the resistor 4 and by the frame 9 itself due to the high temperatures.

Advantageously, the support frame 9 allows heat transfer by convection between the two baking chambers 5, 6. In fact, as shown in the attached figures, frame 9 has a grid-like structure, but in other examples the frame 9 has a plate-like structure provided with several air passages between the two baking chambers 5, 6.

Moreover, the support frame 9 has bars bent upward 10 connected to the first members 8 and portions 11 bent inward, so that the resistor 4 is held between the seats and the bent portions 11 of the frame 9.

Moreover, the baffle means 7 also comprises second members 12 adapted to hinder the radiation of radiating energy toward the upper portion of housing 2 of oven 1. In particular the second members 12 have an elongated shape and are arranged above at least one portion of the resistor 4. In the example shown, each of the two portions at which members 8 are connected is overlapped by an elongated member 12.

In a first embodiment of the oven according to the invention (shown in the attached figures), the first and/or second members are constituted as bars connected to the support frame 9.

In a second embodiment (not shown in the attached figures), the first and/or second members are made of a bent sheet connected to the support frame.

In order to improve the radiance distribution, besides members 12 that partly hinder the energy radiated by the resistor 4 toward the upper portion of the housing 2 of the oven 1, the two short opposed portions 21 and 22 of the resistor 4 remain cold upon switch on. In substance, therefore, heat is only radiated by the portions 20 of the resistor 4, thereby avoiding zones of the slices of bread from being irradiated unevenly. This allows an even toasting of twelve slices of bread, thereby preventing some slices from being more baked than other slices of bread.

The operation of the electrically powered oven in particular for baking or heating sliced bread according to the invention clearly appears from what described and illustrated. In particular, it substantially is as follow:

In particular, the slices of bread are arranged in the box-shaped housing 2 and the oven is switched on (for example, by setting a timer).

The resistors 3, 4 heat up and start radiating energy into the box-shaped housing 2, which bakes or heats the slices of bread.

Baking is effective since the intermediate resistor 4 irradiates both the upper chamber 5 and the lower chamber 6 at the same time.

Moreover, the same intermediate resistor 4 preferably irradiates toward the lower baking chamber 6. The lower baking chamber 6 therefore tends to heat more than the upper baking chamber 5. This generates convective motions that allow a very even heat distribution between the two baking chambers which, in practice, prevents hot air from accumulating in the upper baking chamber.

This allows considerably improving the baking evenness.

Of course, even though reference is always made to the baking or heating of sliced bread, the oven according to the present invention can be used for any type of food.

In a preferred embodiment, the oven according to the invention has resistor control means adapted to repeatedly switch on and off the resistors to prevent their surface from reaching a sufficiently high temperature, thereby generating an intense-radiance.

Advantageously, the control means is adapted to detect the temperature in the oven 1 and switch the resistors 3 and 4 on or off also in relation with such temperature.

The control means comprises, for example, an amperometric bimetallic thermostat electrically connected in series with the resistors, adapted to deform (switching the resistors on or off) due to the temperature inside the oven. Advantageously, such thermostat is also sensitive to the current absorbed by the resistors 3 and 4. Such current produces a further overheating of the thermostat sensitive member which adds to that of the air heated by the resistors.

In practice, therefore, the resistor power supply current contributes to heating the bimetallic thermostat with very quick response times and therefore, very frequent successive switching on and off of the resistors 3 and 4.

In this way the maximum temperature reached by the resistor surface remains limited and the radiance effect is therefore reduced.

The present invention also relates to a procedure for heating an electrically powered oven in particular for baking or heating sliced bread.

The procedure consists in radiating energy mainly toward the lower portion of the oven by at least one resistor 4 arranged in an intermediate position of the box-shaped housing 2 of oven 1 and which defines at least two baking chambers 5, 6, so that the effect of natural convection in the baking chambers 5, 6 is comparable.

Advantageously, the procedure according to the present invention provides for the repeated switching on and off of the resistors, so as to limit the maximum temperature reached by their surfaces for limiting its radiance.

In practice, it has been proved that the electrically powered oven, in particular for baking or heating sliced bread, and the procedure for heating it according to the invention, are especially advantageous since they make possible ovens which have low consumption and require lower production costs compared to traditional ovens.

The electrically powered oven, in particular for baking or heating sliced bread, and the procedure for heating it thus designed can be subject to several changes and variants, all falling within the scope of the inventive idea; moreover, all details can be replaced with technically equivalent elements.

In practice, the materials used as well as the sizes can be of any type according to the requirements and to the prior art.

The invention claimed is:

1. An electrical oven comprising:
   a housing;
   a plurality of resistors in the housing electrically energizeable to radiate heat, at least one of the resistors having a longitudinally extending portion and subdividing the housing into an upper baking chamber and a lower baking chamber,
   a pair of longitudinally extending and round-section first bars horizontally flanking, extending generally a full length of, and slidably receiving the portion of the one resistor and forming a longitudinally extending seat therefor,
   a second longitudinally extending round-section bar above the portion, extending generally a full length thereof, and oriented so as to deflect radiant energy from the portion downward into the lower chamber, the first and second longitudinally extending bars surrounding the portion on both horizontal sides and above and exposing the portion generally only downwardly,
   second transversely extending bars bent upward and connected to the first and second longitudinally extending bars, and
   portions of the first bars bent inward and holding the portion of the one resistor in the seat.

2. The electrical oven according to claim 1 wherein the bars allow heat transfer by convection between the two baking chambers and inhibit radiant heating of the upper chamber by the resistor portion.

3. The electrical oven according to claim 1, further comprising
   resistor control means for repeatedly switching said resistors on and off to prevent their surfaces from reaching a sufficiently high temperature thereby generating an intense radiance.

4. The electrical oven according to claim 3 wherein said control means is provided with a sensor for detecting the temperature inside said oven and is adapted to switch the resistor on an off also in relation to the detected temperature.

5. The electrical oven according to claim 3 wherein said control means comprises a bimetallic thermostat electrically connected in series with said resistors, said thermostat being adapted to switch in response to a temperature inside the oven and also in response to heat produced by current used by said resistors.

6. The electrical oven defined in claim 1 wherein the portion of the one resistor is elongated and the bars horizontally flank the portion of the one resistor.

* * * * *